(12) United States Patent
Brandstatter

(10) Patent No.: US 7,841,617 B2
(45) Date of Patent: Nov. 30, 2010

(54) INTERIOR TRIMMING PIECE

(75) Inventor: Albert Brandstatter, Odelzhausen (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 849 days.

(21) Appl. No.: 10/543,520

(22) PCT Filed: Jan. 29, 2004

(86) PCT No.: PCT/EP2004/000802

§ 371 (c)(1),
(2), (4) Date: Mar. 28, 2006

(87) PCT Pub. No.: WO2004/067334

PCT Pub. Date: Aug. 12, 2004

(65) Prior Publication Data

US 2006/0175808 A1  Aug. 10, 2006

(30) Foreign Application Priority Data

Jan. 29, 2003  (DE)  ................ 103 04 197

(51) Int. Cl.
*B60R 21/16* (2006.01)
*B60R 21/205* (2006.01)
(52) U.S. Cl. .................... 280/728.3; 280/732
(58) Field of Classification Search .............. 280/728.3, 280/732; *B60R 21/16, 21/205*
See application file for complete search history.

(56) References Cited

U.S. PATENT DOCUMENTS

| 5,437,470 | A | * | 8/1995 | Terai et al. ............... 280/728.3 |
| 5,564,733 | A | | 10/1996 | Duenas et al. |
| 5,810,388 | A | | 9/1998 | Berardi et al. |
| 6,070,901 | A | | 6/2000 | Hazell et al. |
| 6,322,101 | B1 | | 11/2001 | Suizu et al. |
| 6,354,623 | B1 | * | 3/2002 | Delmastro ................. 280/732 |
| 6,402,189 | B1 | | 6/2002 | Gray et al. |
| 6,517,100 | B2 | * | 2/2003 | Frisch .................... 280/728.2 |
| 6,536,801 | B2 | * | 3/2003 | Frisch .................... 280/743.1 |
| 6,663,142 | B2 | * | 12/2003 | Terao et al. ................ 280/731 |
| 6,966,575 | B2 | * | 11/2005 | Kobayashi et al. ....... 280/728.3 |
| 7,367,587 | B2 | * | 5/2008 | Taoka ........................ 280/751 |
| 7,615,177 | B2 | * | 11/2009 | Izumi et al. ................ 264/255 |
| 2002/0125689 | A1 | | 9/2002 | Pinsenschaum et al. |

FOREIGN PATENT DOCUMENTS

DE  199 48 125  4/2000

* cited by examiner

*Primary Examiner*—Paul N. Dickson
*Assistant Examiner*—Joselynn Y. Sliteris
(74) *Attorney, Agent, or Firm*—Fay Kaplun & Marcin, LLP

(57) ABSTRACT

Described is an interior trimming piece (e.g., for a motor vehicle) which includes (a) a plastic substrate; (b) a metal reinforcing piece connected to the substrate and (c) at least one bridge. The metal reinforcing piece includes (i) a hinge sheet for bridging a channel for passage of an airbag in at least one region and (ii) a fastening frame for an airbag module which is connected in one piece with the hinge sheet via a hinge web. The at least one bridge engages behind the substrate in the at least one region. The bridge fixes the fastening frame to the substrate. The hinge sheet is mounted on a side of the substrate which faces away from an interior.

18 Claims, 7 Drawing Sheets

INTERIOR TRIMMING PIECE

FIELD OF INVENTION

The present invention relates to an interior trimming piece.

BACKGROUND INFORMATION

For such interior trimming pieces, in particular in modern motor vehicles there arises the object of not only being lightweight and environmentally friendly, but also affording opportunities for the passage of airbag modules arranged behind the interior trimming piece.

Thus a generic interior trimming piece for motor vehicles is known, which has a plastic substrate and, connected thereto, a metal reinforcing piece provided with a hinge sheet for bridging a channel for passage of an airbag in at least one region. This metal reinforcing piece is e.g. a sheet metal piece which is riveted to the plastic substrate and which has a predefined bending edge, so that in case of release of an airbag this bending edge serves as a hinge for an airbag flap, while the plastic substrate is torn open in the region of the channel for passage of the airbag.

The metal piece here also has the object of providing a rigid means for bridging the channel for passage of the airbag during normal running of the vehicle.

Disadvantages of known interior trimming pieces, however, often lie in the controlled hinging of the flap, that is, opening of the channel for passage of an airbag when the airbag is released. Here, firstly it is sensible to at least roughly control the angle of opening of the flap, and secondly there should be a very firm grip between plastic substrate and metal reinforcing piece, so that no metal pieces can possibly enter the interior of the vehicle accidentally.

For this purpose there must be sufficient strength of the bond between metal reinforcing piece and plastic substrate to accomplish the highly dynamic forces when the airbag is fired without accidental deformation or fractures of the plastic substrate. Thus e.g. even the formation of a "bulge" with insufficiently rigid constructions is a serious drawback.

On the other hand, there should not be an unsafe result in the "head impact" test on the instrument panel due to too rigid a design e.g. of the plastic substrate, which furthermore can be very expensive and is weight-intensive in the construction. That is to say, there must be sufficient elasticity of the interior trimming piece/instrument panel in order not to cause serious injuries if passengers strike the instrument panel.

A disadvantage of all generic interior trimming pieces known in the state of the art is also that a join of the plastic substrate to the metal reinforcing piece is visible because, particularly e.g. after intensive solar radiation, arches or rivet heads stand out through a decorative layer which seals off from the interior of the motor vehicle.

SUMMARY OF INVENTION

The present invention relates an interior trimming piece for motor vehicles, which on the one hand are cheap to make and on the other hand have invisible openings for passage of airbags, and in particular have sufficient deformability to achieve good results in a "head impact test", with high stability.

Due to the fact that, in a generic interior trimming piece, the metal reinforcing piece has a fastening frame for an airbag module which is connected in one piece with the hinge sheet via a hinge web, this object is achieved.

The metal reinforcing piece is rigidly connected to the plastic substrate via a fastening frame. This fastening frame, which completely surrounds the hinge sheet preferably in one plane (as a result manufacture is particularly simple because the hinge sheet must be cut or punched out of a metal sheet only in one region), already exhibits high inherent stability. Moreover, cheap manufacture of this metal reinforcing piece is possible because it can be made easily in one piece and therefore cheaply. The metal reinforcing piece therefore integrally contains the fastening frame, the hinge sheet and (connecting the two) the hinge web which will later form the "bending edge" of the hinge upon release of an airbag.

It is now particularly advantageous that an airbag module can be fastened direct to this fastening frame. Such an airbag module regularly contains a cup-shaped receptacle for a folded-up gas bag as well as a release mechanism which, e.g. on account of compressed air or a detonating primer with electrical trigger device, provides an inflatable airbag. This airbag module is regularly mounted on the side of the plastic substrate facing away from the interior of the motor vehicle, so that, upon release of the airbag, the latter, coming through the channel for passage of the airbag, folds back the hinge sheet (tearing open a portion of the plastic substrate) and so allows unfolding of the airbag in the motor vehicle interior for passenger protection.

Fastening of the airbag module to the fastening frame can here basically be effected in any way, for example, by welding, screwing, etc. It is important that by this means the airbag module can be practically "hung" on the plastic substrate, so that no attachment to a cross member of a motor vehicle is necessary. By eliminating this attachment to the cross member, moreover, the excellent results of the interior trimming piece according to the invention are obtained in a "head impact test". This is due to the fact that, upon impact on the interior trimming piece, the latter can yield better and there is no "hard blow" in the case of a cross member. Here, however, in particular the stable, "closed" fastening frame ensures that there is no unnecessary "bulging" of the plastic substrate upon release of the airbag, which might possibly entail safety risks again.

To sum up, therefore, it can be stated that the following requirements are covered by the one-piece multi-functional airbag hinge plate (metal reinforcing piece):

price advantage over multi-piece systems, because this is a one-piece system;

controlled hinging of the flap (hinge sheet);

shielding from the plastic substrate and absorption of the highly dynamic forces when the airbag is fired (this effect occurs particularly at low temperatures, for example, below −35 degrees Celsius);

attachment of the airbag module direct to the functional substrate (plastic substrate) is possible without support on an additional supporting tube (cross member);

the boundary conditions for the "head impact test" are nevertheless fulfilled.

According to the invention, in addition it is made possible for the "bimetal effect", which is responsible e.g. for arching of the plastic substrate in case of severe heating, is eliminated.

One particularly important advantageous development provides that the airbag module and/or the fastening frame are suspended from the plastic substrate. That is to say, the airbag module is "freely suspended" on the side of the plastic substrate facing away from the motor vehicle interior, and additional coupling to a cross member or supporting tube is not necessary. This firstly simplifies the effort of manufacture. No additional coupling which would have to be done during final assembly is provided here; it is only necessary to carry out electrical attachment of the airbag module to a control mechanism for airbag release during final assembly. By this means, therefore, it is made possible for the metal reinforcing piece or the airbag module to be connected only to the plastic substrate, and no further coupling is necessary. It turned out here that the minimum distance from an airbag module to a supporting tube or cross member in at least one spatial direction should be at least 40 mm.

A further advantageous development provides that the plastic substrate completely covers the channel for passage of the airbag. This ensures that in the normal state extensive protection of the airbag module underneath is guaranteed. Here, the plastic substrate can have a predetermined break line round the channel for passage of the airbag (preferably below the decorative layer visible to the vehicle passengers, e.g. on the reverse side of the plastic substrate), to guarantee invisibility of the airbag channel. For this purpose it is moreover possible for the hinge sheet of the metal reinforcing piece to be mounted on the side of the plastic substrate facing away from the motor vehicle interior. The plastic substrate can, depending on the desired appearance or feel, be covered with foam and/or a decorative film on the side facing towards the motor vehicle interior. The decoration can be e.g. made of leather or a plastic such as PVC, also a suitable PVC foam film e.g. 1.5 mm thick can be applied in order to obtain a pleasant feel and good appearance cheaply, and for this purpose e.g. backing with a PVC foam film no. 34 2.5 mm thick Bayblend T85 is possible (these are ABS/PC plastic components).

The plastic substrate can preferably also be constructed in several layers. For this purpose the plastic substrate has e.g. on the side facing towards the motor vehicle interior a preferably continuous layer of foam and/or further decorative layers. Among them, the plastic substrate may have a further piece which primarily serves for stability. This piece is made e.g. of ABS/PC and is 0.5 to 3 mm, preferably 2 to 3 mm, optimally 2.5 mm, thick (at greater thicknesses the "invisibility" is limited). This ensures that the plastic substrate is self-supporting.

A particularly advantageous embodiment provides that at least one bridge engaging behind the plastic substrate at least in one region is provided, for fixing the fastening frame to the plastic substrate. This bridge makes it possible for there to be particularly strong support between plastic substrate and fastening frame. Even in case of airbag release at very low temperatures, this bridge engaging behind ensures that the fastening frame is not torn out in the direction opposite the direction of release of the airbag, so that, for this reason too, support on a cross member or extra supporting tube is unnecessary. The bridge can here be made of any materials, e.g. steel sheet, but also diecast aluminum or a plastic which has sufficient tensile strength.

In this case, for visual reasons it is particularly advantageous for the motor vehicle passengers if the plastic substrate described above has an upper portion oriented towards the motor vehicle interior, and a lower portion connected thereto and located thereunder, with surrounds for receiving the section which engages behind, the surrounds being concealed from the vehicle interior by the upper portion. Here it is, as it were, ensured that, due to these surrounds/depressions in the lower portion, firm coupling of the fastening frame to the plastic substrate is made possible without the appearance on the vehicle interior side having to suffer.

In this case it is particularly advantageous that the bridge has two webs protruding on the lower side of the lower portion of the plastic substrate, for the suspension of an airbag module. The airbag module can be e.g. welded or bolted to these webs.

The metal reinforcing piece can be a metal sheet with a thickness from 0.5 to 1.5 mm, preferably 0.7 to 0.9 mm. In particular, low-tensile metal sheet is possible as the material, e.g. "tin metal" (material: sheet metal DX50). With these materials for the metal reinforcing piece it is ensured that on the one hand there is sufficient stability of bridging the channel for passage of the airbag and on the other hand there is an assured hinge function upon passage of an airbag.

One particularly advantageous development provides that the hinge web is bent in such a way that, upon release of the airbag, the hinge sheet is first moved in the direction of the channel for passage of the airbag and, after movement of the hinge sheet out into the motor vehicle interior, the hinge sheet bends up sideways to free the unfolding airbag. The plastic substrate should in the process be torn open to such an extent that the decorative layer is "bevelled off", then the "door effect" of the hinge sets in.

In a preferred embodiment in which a plastic substrate has towards the interior a "decorative surface" with an e.g. PVC foam film and, underneath, for reasons of stability a harder plastic, e.g. ABS, it is e.g. possible to provide the coupling between hinge sheet and plastic substrate only in the region of the decorative surface. That is to say, the "stability-forming" portion of the plastic substrate is hollowed out in this region and here completely bridged by the hinge sheet.

Basically, the invention can be employed for all interior trimming pieces in motor vehicles, regardless of whether it is an instrument panel, a side trim or e.g. the headspace region of a motor vehicle.

BRIEF DESCRIPTION OF DRAWINGS

Further advantageous developments of the present invention are described in the other dependent claims. The invention will now be described with the aid of the following figures:

DETAILED DESCRIPTION

Figure 1:
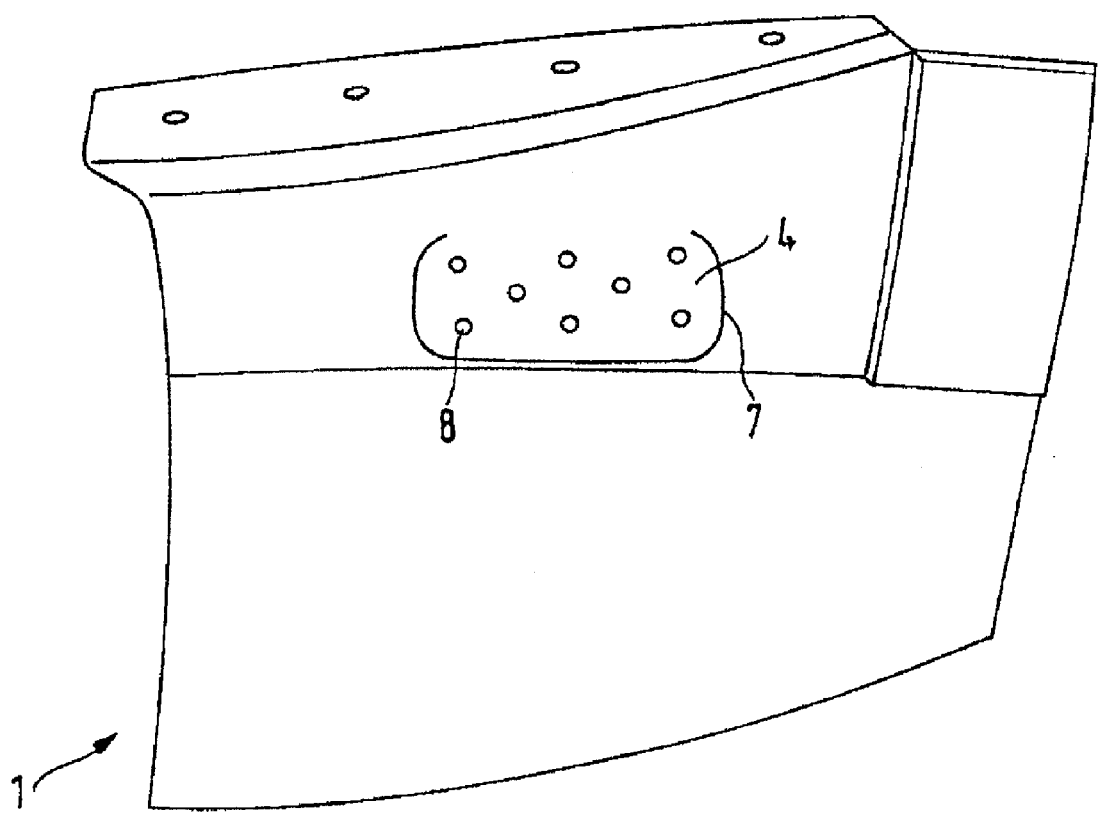
FIG. 1 shows an interior trimming piece according to an exemplary embodiment of the invention from the interior of the motor vehicle.

FIG. 1 shows an interior trimming piece 1 according to the invention, seen from the interior of a motor vehicle. This interior trimming piece has an airbag system which is normally "invisible" to the vehicle passengers. Only for illustration are there therefore provided in FIG. 1 a predetermined break line 7 of the interior trimming piece (which is applied e.g. on the reverse side and hence invisible) and pairs of fixing elements and recesses, which in FIG. 1 are constructed as a total of eight domes (see reference number "8") (the predetermined break line 7 overlaps the firing channel so that no deformation and hence visibility of the predetermined break point can occur due to unauthorised pressure on the surface). The predetermined break line 7 forms the outer contour of a channel 4 for passage of an airbag into the interior of the motor vehicle. The interior trimming piece shown in FIG. 1 forms part of an instrument panel of a modern motor vehicle.

Below, the construction of a plastic substrate which is contained in the interior trimming piece is described.

Figure 2:
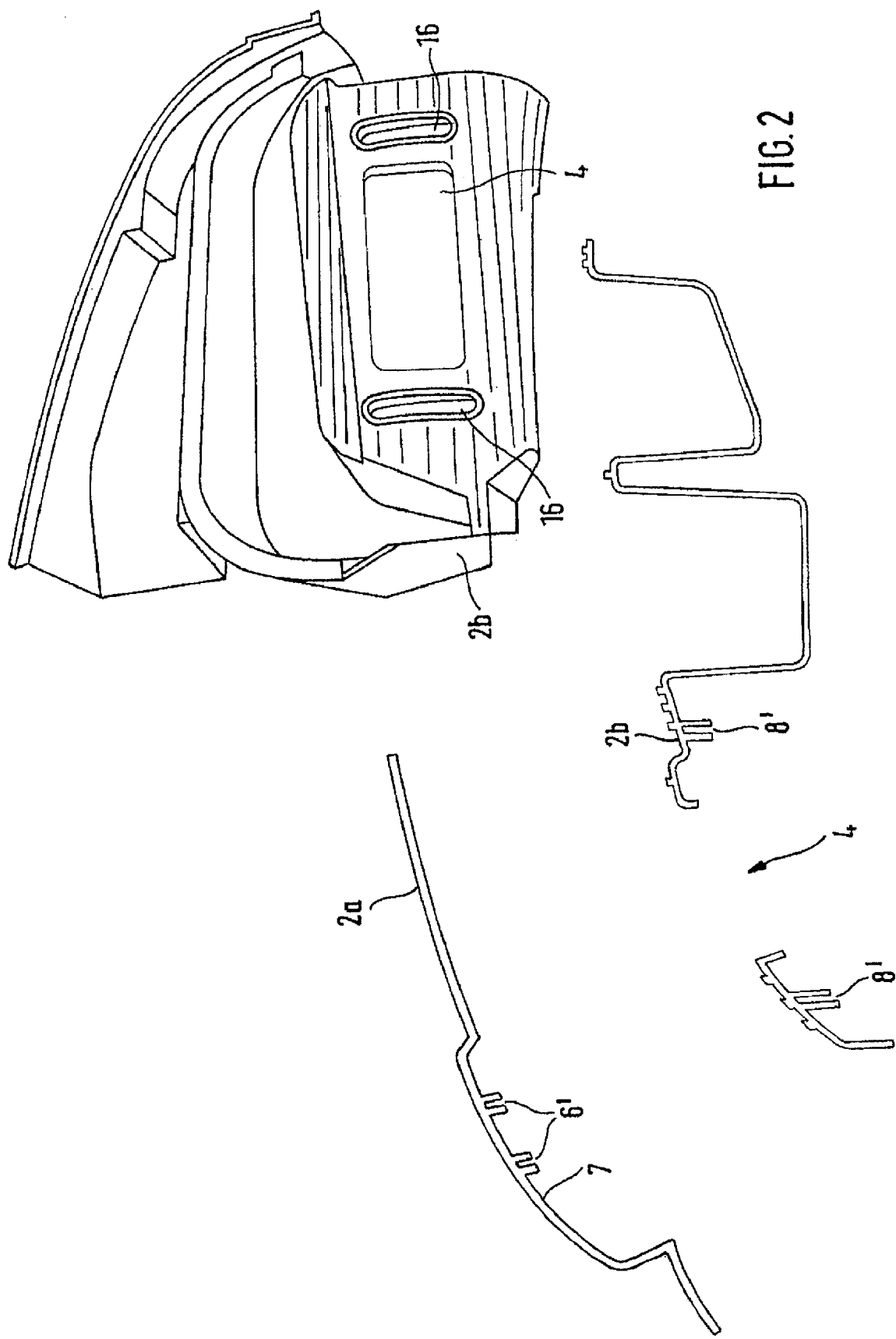
FIG. 2 shows components of a multi-piece plastic substrate.

FIG. 2 shows elements of a two-piece plastic substrate. This has to begin with a lower portion 2b which serves primarily for stability and rigidity of connection. This lower portion 2b is shown once (at the bottom) in cross-section. In this case it can be seen clearly that there is an aperture in the region of the channel 4 for passage of the airbag. This can also be seen again in the other view of the lower portion 2b which is shown at the top right in FIG. 2. Here too is shown a channel 4 for passage of an airbag. On the surface in the view top right of the lower portion 2b can be seen lines along the upper surface of this lower portion 2b. These parts serve for fixing, e.g. by vibration welding, of an upper portion 2a which is to be applied to the lower portion 2b and which is shown at the top left in FIG. 2. The lower portion 2b is made of a stable plastic, e.g. ABS/PC, and is e.g. 2.5 mm thick.

On the lower portion 2b is laid the portion 2a. This is the upper portion which is backed with a PVC film and which towards the interior of the motor vehicle (that is, to the top left in FIG. 2) has a grained or smooth film which is lined with a foam. Naturally, other embodiments are possible too, e.g. an additional decoration with leather etc. is provided or a foam filling for making an even thicker foam layer. The portions 2a and 2b are joined in such a way that the plastic substrate 2 shown in FIG. 3 results. Here, it should already now be pointed out that the predetermined break line 7 shown in FIG. 1 is located in the edge region of the channel 4 for passage of the airbag, and that "dome blanks" 6' are provided which, after subsequent melting of their ends, will form fixing elements for fixing the hinge sheet. Moreover, screw domes 8' are provided for fastening a fastening frame of a metal reinforcing piece according to the invention. Fastening is effected here advantageously by melting the ends for gripping of the fastening frame by engaging behind (for dome blanks 6'), for screw domes 8' by screwing with e.g. a self-tapping screw while engaging behind.

Figure 3:
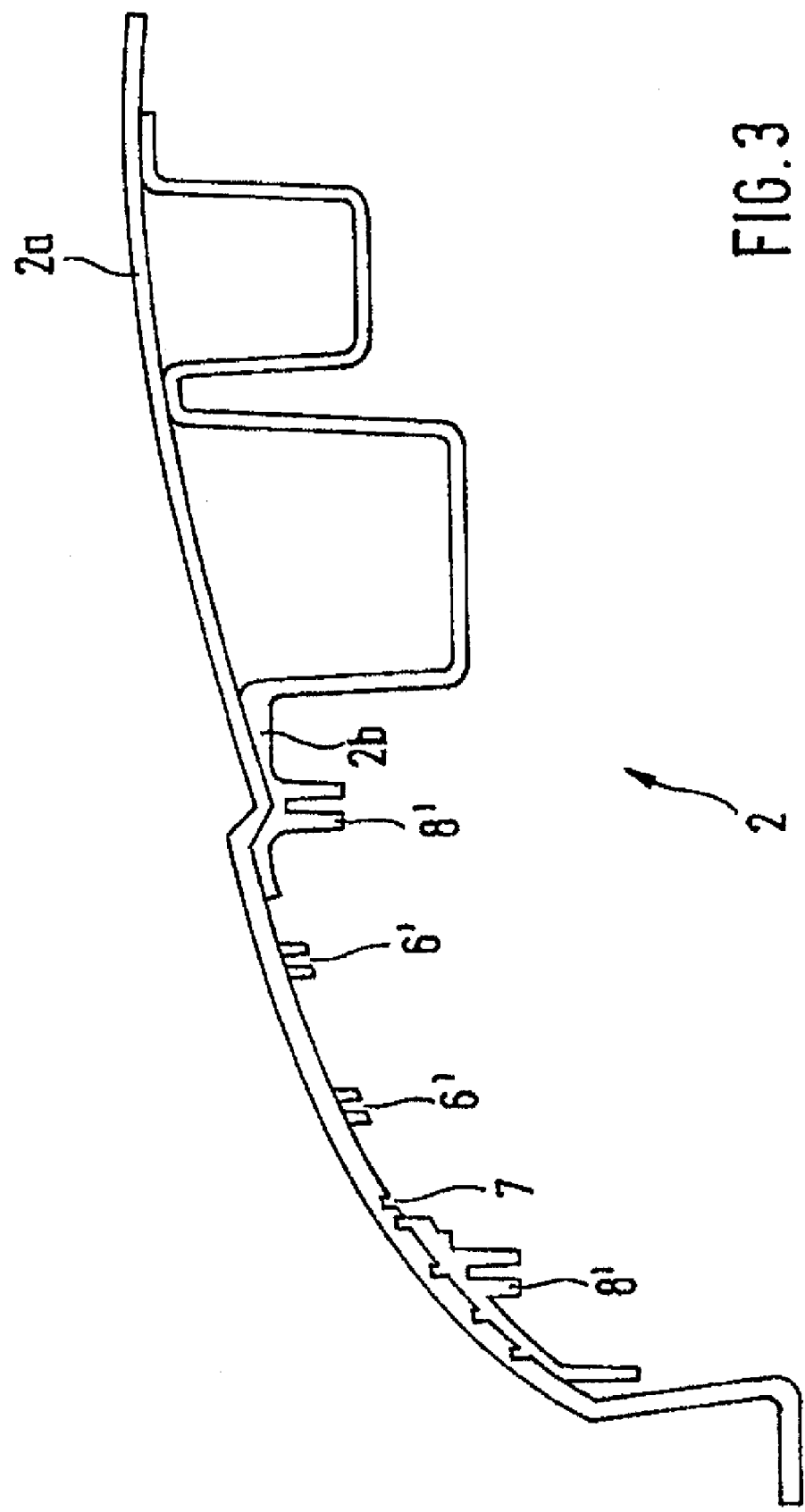
FIG. 3 shows the components as in FIG. 2 in the joined-up form.

The plastic substrate 2 shown in FIG. 3 has a shape which meets any demands of design. The embodiment shown in FIG. 3 shows an instrument panel. For this purpose, in particular additional channels, for example, for air conduction, can be provided in the lower portion 2b.

Figure 4:
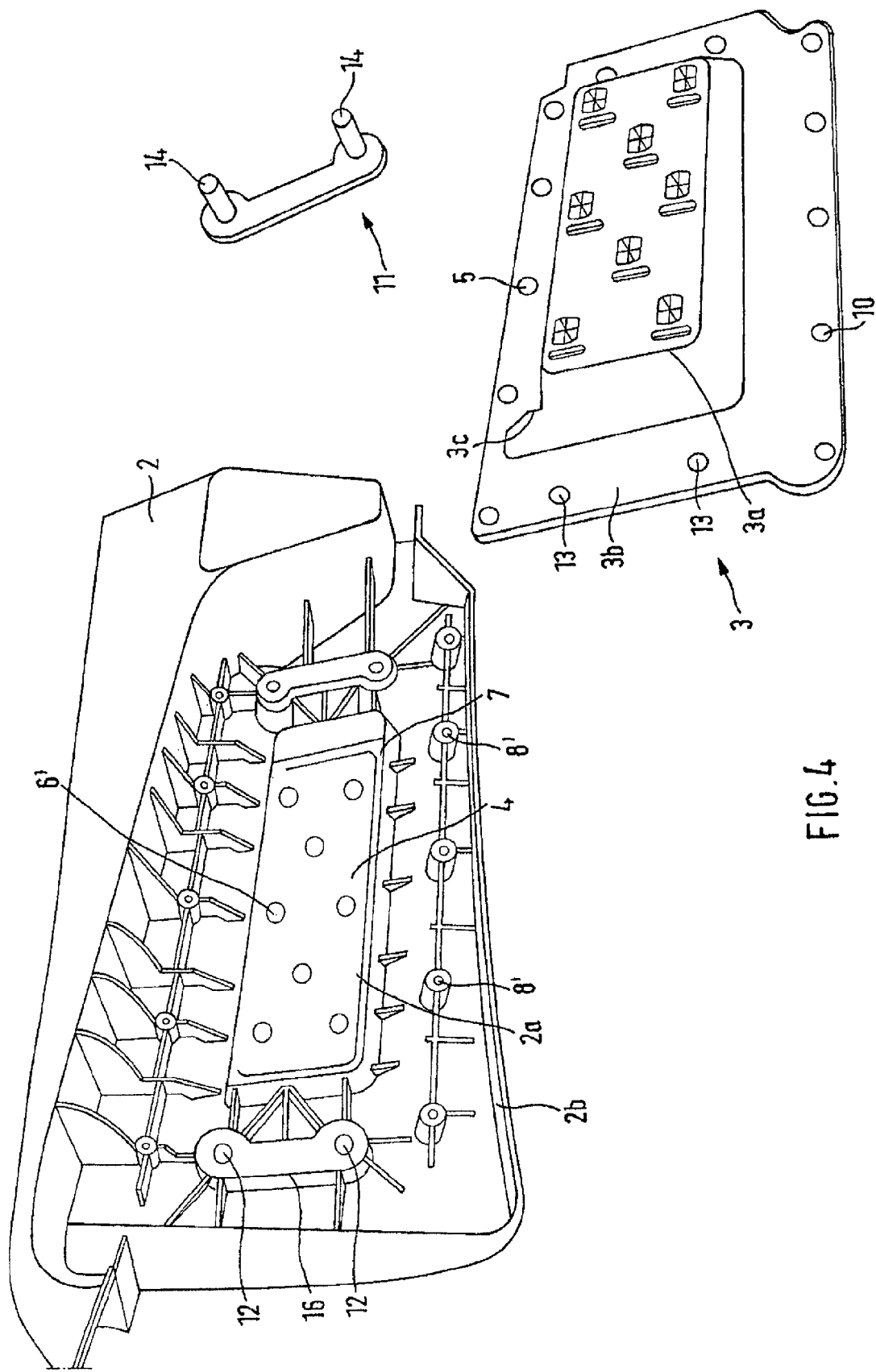
FIG. 4 shows a part of a plastic substrate with a metal reinforcing piece and a bridge piece according to an exemplary embodiment of the present invention.

FIG. 4 shows again a detail of the plastic substrate 2 from its "reverse side", that is, from the side facing away from the motor vehicle interior in the fitted state. Here it can be seen that the channel 4 for passage of the airbag is closed by the portion 2a. Moreover, the "dome blanks" 6' can be seen. On these dome blanks is placed a hinge sheet 3a with recesses 5, as can be seen in FIG. 4. The recesses 5 of the hinge sheet 3a match the dome blanks 6' in shape. The hinge sheet 3a belongs to a metal reinforcing piece 3 which is frame-like with the centrally arranged hinge sheet 3a. The metal reinforcing piece further has in its edge region a fastening frame 3b according to the invention for an airbag module, which is connected in one piece with the hinge sheet 3a via a hinge web 3c. In this edge region are provided holes 10 which serve to fix the edge region to the reverse side of the plastic substrate 2 in corresponding screw domes 8' (which are then melted or provided with screws to engage behind, for fastening). The metal reinforcing piece is a deep-drawn sheet metal piece (tin metal) which has a continuous thickness of 0.8 mm. The metal reinforcing piece (or the hinge sheet) is mounted on the side of the plastic substrate 2 facing away from a motor vehicle interior, at least the upper portion 2a of the plastic substrate covering the channel 4 for passage of the airbag.

It should be noted that the metal reinforcing piece 3 and the plastic substrate 2 are shaped in such a way that the hinge sheet 3a in the joined position of metal reinforcing piece 3 and plastic substrate 2 offers planar support of the section 2a which covers the channel 4 for passage of the airbag. Only as a result of this does the desired invisible appearance arise, as the hinge sheet 3a thus follows the overall contour of the interior trimming piece 1.

In FIG. 4 is also shown at the top right a metal bridge 11 which is designed as a flat piece with welded-on threaded bolt or web 14 for fastening an airbag module. This bridge is inserted with the webs towards the plastic substrate (in this case the lower portion 2b) in depressions 16 (see also FIG. 2 top right), so that the webs 14 pass through holes 12 (see FIG. 4 top left) in the lower portion and protrude on the side of the plastic substrate facing away from the motor vehicle interior.

In all, two bridges 11 are provided for fixing the airbag module, which are inserted in corresponding complementary surrounds or recesses 16 (see FIGS. 2 and 4) for subsequent fixing of the fastening frame and airbag module to the plastic substrate (this is detailed more precisely in FIG. 6 again). In the present case, therefore, a plastic substrate 2 with an upper portion 2a oriented towards the interior of the motor vehicle and with a lower portion 2b joined thereto with surrounds 16 for receiving the section of the bridge which engages behind, is provided, the surrounds being concealed from the vehicle interior by the upper portion 2a.

In FIG. 4 at the top left the bridges 11 are therefore already anchored in the plastic substrate 2, that is, in the recesses 16. The threaded bolts or webs 14 here protrude from the sheet plane out of the holes 12 which are provided for this purpose in the lower portion 2b.

Following the state shown in FIG. 4, melting of the dome blanks 6' and screwing with the screw domes 8' take place. Due to screwing of the screw domes 8', there is engagement behind the holes 10 in the fastening frame 3b, so that the latter is rigidly connected to the lower portion 2b. By melting of the dome blanks 6', attachment of the hinge sheet 3a to the upper portion 2a takes place. Engagement behind the plastic substrate can here take place by ultrasonic welding or by thermal melting. Naturally, it is also always possible to use external components here, for example, screws made of metal or plastic, for fastening.

Figure 5:
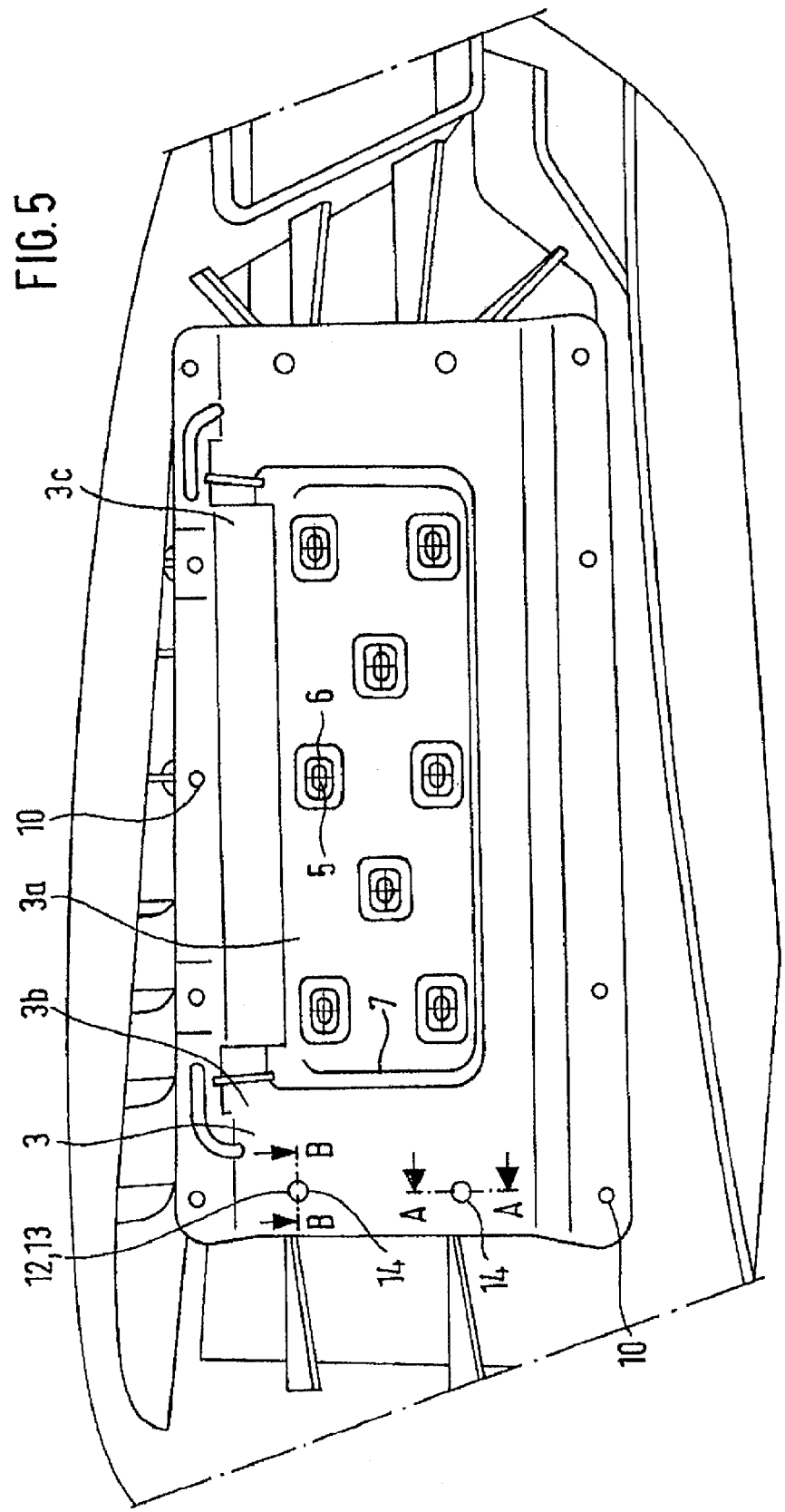
FIG. 5 shows an interior trimming piece according to the present invention as in FIG. 1 seen from the side facing away from the motor vehicle interior.

Moreover, in FIG. 5 it can be seen clearly that the webs/threaded bolts 14 of the bridge 11, which pass through holes 12 in the plastic substrate and aligned holes 13 in the metal reinforcing piece 3, protrude from the sheet plane. These webs 14 serve to fasten an airbag module 15, which is detailed more precisely in FIG. 6 again.

Moreover, in FIG. 5 can be seen clearly a hinge web 3c which is arranged between the fastening frame 3b and the hinge sheet 3a. It can be seen here that this hinge web has a "graduation". As a result, the hinge web is bent in such a way that, upon release of the airbag, the hinge sheet 3a is first moved in the direction (reference number 17 in FIG. 6) of the channel 4 for passage of the airbag, and after movement of the hinge sheet out into the interior of the motor vehicle, it bends up sideways to free the unfolding airbag.

Figure 6:
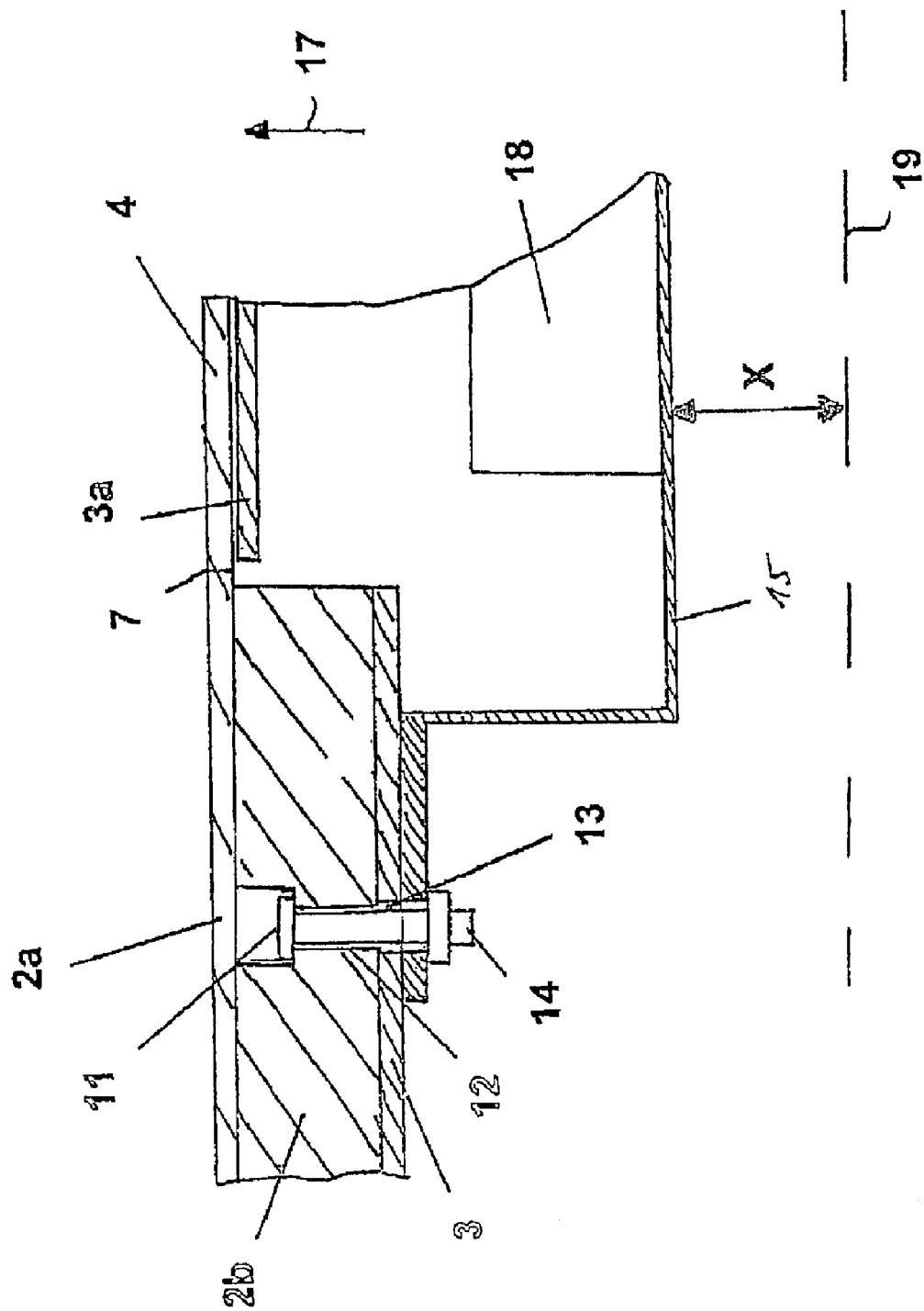
FIG. 6 shows a section through the interior trimming piece as in FIG. 5 (with attached airbag module) along A-A.

FIG. 6 shows a section along A-A as in FIG. 5. Here is again shown in section the plastic substrate piece 2 which consists of an upper portion 2a and a lower portion 2b. In the recess or surround 16 is arranged one (of two) bridges 11 with webs/threaded bolts 14, which passes through a hole 12 in the lower portion 2b. The metal reinforcing piece 3 is moreover fastened to the lower portion 2b by weld and screw joints, not shown here. The holes 13 in the metal reinforcing piece 3 are arranged in alignment with the holes 12 in the lower portion 2b, and the web 14 of the bridge also passes through the hole 13 shown in FIG. 6. The web 14 protrudes beyond the metal reinforcing piece 3 on the side of the plastic substrate facing away from the interior of the motor vehicle. Attached to this section is an airbag module 15 with an airbag 18. The airbag module has a cup-like outer shape with a protruding edge. In this edge are provided holes for passage of the web(s) 14 and for fastening the airbag module 15 to the plastic substrate 2 or the fastening frame 3b of the metal reinforcing piece 3 so as to engage behind. Fastening can in this case be effected by welding or screwing, but also by riveting, gluing or other common joining methods. Of course it is, however, also possible for the airbag module 15 in its edge region to be not directly in contact with the web 14. Instead, it is e.g. also possible for the bridge 11 to be used only to fix the metal reinforcing piece 3 better, and for the airbag module to be connected to the metal reinforcing piece 3 at a point other than at the web 14. In this case fastening of the web 14 direct to the metal reinforcing piece 3 or fastening frame 3a so as to engage behind, is to be provided.

In FIG. 6 it can also be seen how an uninflated airbag 18 is mounted within the airbag module 15 and, upon release, exits through the channel 4 for passage of the airbag, the hinge sheet 3a being first moved in direction 17, tearing the predetermined break line.

Upon this release of the airbag there is a reaction force (but not disappearance of the airbag module!) in the direction opposite direction 17. On account of the fastening of the airbag module according to the invention, it is possible to "suspend" the airbag module 15 only from the fastening frame 3b/the plastic substrate 2. It is not necessary to provide an additional fixing to a cross member (reference number 19 in FIG. 6). This affords the added advantage that, upon "impact" of a vehicle passenger on the interior trimming piece (in the direction opposite direction 17), there is sufficient elasticity of the interior trimming piece, because between the cross member 19 and the airbag module 15 there is a minimum distance of 40 mm in the spatial direction shown in FIG. 6.

Figure 7:
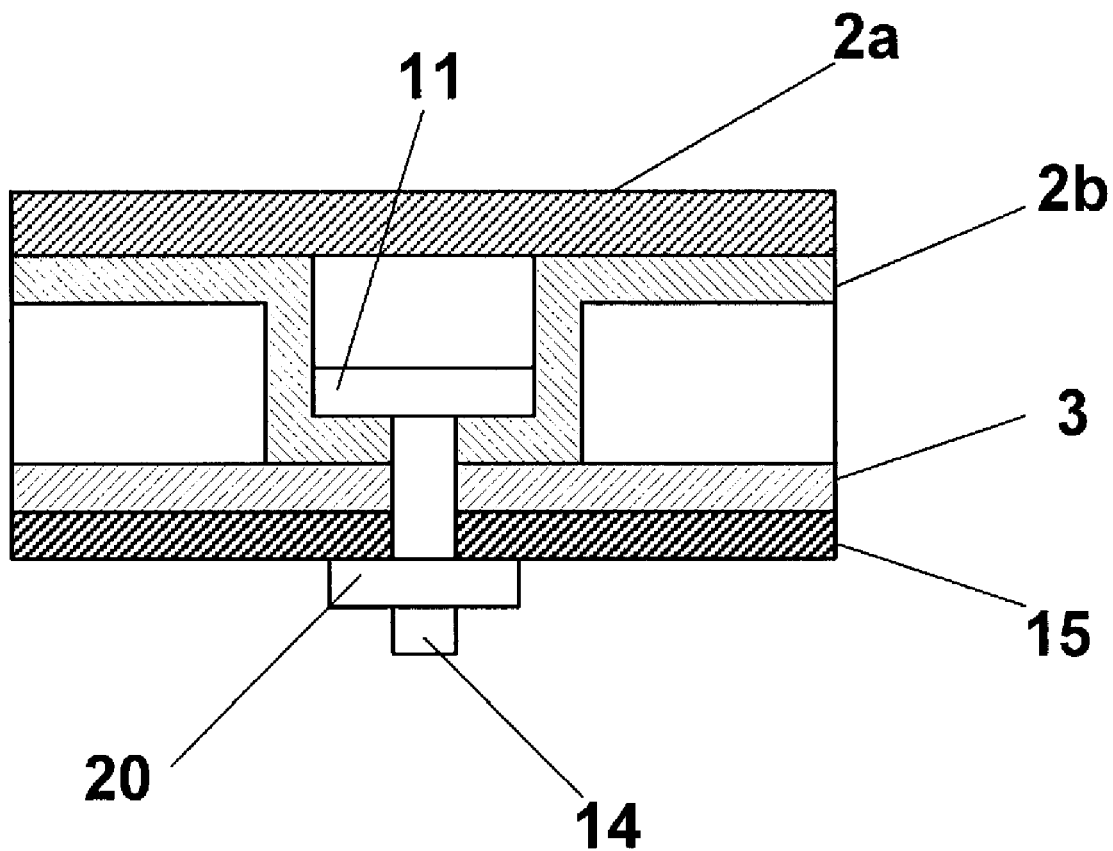
FIG. 7 shows a section through the interior trimming piece as in FIG. 5 (with attached airbag module) along B-B.

While FIG. 6 first shows in general the layered structure of the interior trimming piece in section A-A, in FIG. 7 is shown with reference to the section B-B a special kind of layered structure which is favourable in the field of large-scale production. It goes without saying that the structure shown here in FIG. 7 would hold good as standard for all webs 14 of an interior trimming piece 1 according to the invention.

In FIG. 7 is again shown an upper portion 2a with a lower portion 2b underneath. The sheet metal bridge is here e.g. a deep-drawn metal strip containing two bores through which webs in the form of threaded bolts 14 are inserted to engage behind. These threaded bolts may in addition be e.g. spot-welded on their head side to the metal bridge 11. The metal bridge 11 is countersunk in a recess, so that it is not visible from the upper side 2a, i.e. on the interior side of the motor vehicle. By locking with a nut 20 which is screwed onto the thread of the threaded bolt 14, the metal reinforcing piece 3 and the airbag module 15 are fixed tight.

The present invention has some special advantages which should be briefly emphasised again below.

Thus it is possible to suspend an airbag module only from a plastic substrate which e.g. forms part of an instrument panel of a motor vehicle. Fastening of the airbag module is therefore effected exclusively to the fastening frame of the metal reinforcing piece according to the invention or to the interior trimming piece connected thereto. In this way it is therefore possible to provide the whole airbag module only on the interior trimming piece itself. Hence in practice it is fastened to the reverse side of, for example, an instrument panel. This results in easier assembly, as additional connection of the airbag module to its support (for example, to a cross member or an interior door panel, etc.) is not necessary. The stability of the metal reinforcing frame which is connected to the interior trimming piece is sufficient for this. As a result, on the one hand a strong grip of the airbag module on the metal reinforcing piece is achieved. Nevertheless, a certain flexibility of the instrument panel is still obtained, which brings advantages particularly in the "head impact test". If the airbag module were fastened to supporting (metal) parts or e.g. a cross member, the desired flexibility would not be provided.

Particularly good attachment of the airbag module to the metal reinforcing piece is ensured in particular by a bridge engaging behind, which for example contains at least two fastening bolts or fastening screws and forms a connection between the latter. In this way it is possible to engage behind the substrate, which is for example made only of plastic, over a relatively wide area, so that a very stable structure is formed between metal reinforcing piece, substrate piece (plastic substrate) and airbag module, which would not be possible using individual ordinary cap screws to engage behind.

The invention is further advantageous finally as a result of the possible design of the hinge web. The latter can, for example, be bent in such a way that, upon release of the airbag, the hinge sheet is first moved in the direction of the channel for passage of the airbag, and after movement of the hinge out into the motor vehicle interior, it bends away from the airbag channel to free the unfolding airbag.

Thus it is, for example, possible to provide the hinge with a particular three-dimensional shape. Thus the hinge web can, for example, have a graduation in cross-section. This may, for example, be one or two steps which, from the edge of the fastening frame to the hinge sheet, appear in cross-section as a graduation. In this case it is also possible for the individual steps of this graduation to have different heights over the length of the hinge web, in order to be able to equalise, for example, inclinations of the instrument panel accordingly.

The invention claimed is:

1. An interior trimming piece, comprising:
a plastic substrate;
a metal reinforcing piece connected to the substrate, the metal reinforcing piece including (i) a hinge sheet for bridging a channel for passage of an airbag in at least one region and (ii) a fastening frame for an airbag module, the fastening frame connected in one piece with the hinge sheet via a hinge web,
wherein the substrate includes (i) an upper portion oriented towards an interior of a passenger compartment and (ii) a lower portion connected to the upper portion and located under the upper portion, the lower portion having depressions for receiving therein a section of at least one separate arrangement engaging behind the lower portion in at least one region for fixing the fastening frame to the lower portion, the depressions being concealed from the interior of a passenger compartment by the upper portion.

2. The interior trimming piece according to claim 1, wherein the interior trimming piece is utilized in a motor vehicle.

3. The interior trimming piece according to claim 1, wherein at least one of (i) the fastening frame and (ii) the airbag module is suspended from the lower portion.

4. The interior trimming piece according to claim 1, wherein the separate arrangement is made of one of a metal sheet and plastic.

5. The interior trimming piece according to claim 1, wherein the separate arrangement has two webs protruding on a lower side of the lower portion, the two webs suspending the airbag module.

6. The interior trimming piece according to claim 1, wherein the fastening frame is fastened to the lower portion at spots.

7. The interior trimming piece according to claim 1, wherein the hinge web has a graduation so that, upon release of the airbag, the hinge sheet is first moved in a direction of the airbag channel and, after movement of the hinge sheet out into the interior of the passenger compartment, the hinge sheet bends away from the airbag channel to free the unfolding airbag.

8. The interior trimming piece according to claim 1, wherein the substrate covers the airbag channel.

9. The interior trimming piece according to claim 8, wherein the substrate has a predetermined break line surrounding the airbag channel.

10. The interior trimming piece according to claim 1, wherein the substrate is at least partly made of ABS, the substrate being 0.5-3 mm thick.

11. The interior trimming piece according to claim 1, wherein the substrate is at least partly made of ABS, the substrate being 2-3 mm thick.

12. The interior trimming piece according to claim 1, wherein the substrate is at least partly made of ABS, the substrate being 2.5 mm thick.

13. The interior trimming piece according to claim 1, wherein the metal reinforcing piece is 0.5-1.5 mm thick.

14. The interior trimming piece according to claim 1, wherein the metal reinforcing piece is 0.7-0.9 mm thick.

15. The interior trimming piece according to claim 1, wherein one of an instrument panel and a side trim of a motor vehicle includes the piece.

16. The interior trimming piece according to claim 1, wherein the at least one separate arrangement is a bridge.

17. A motor vehicle, comprising:

a component; and an interior trimming piece being adjoined to the component and including (i) a plastic substrate and (ii) a metal reinforcing piece, the metal reinforcing piece being connected to the substrate, the metal reinforcing piece including (i) a hinge sheet for bridging a channel for passage of an airbag in at least one region and (ii) a fastening frame for an airbag module, the fastening frame connected in one piece with the hinge sheet via a hinge web, wherein the substrate includes (i) an upper portion oriented towards an interior of a passenger compartment and (ii) a lower portion connected to the upper portion and located under the upper portion, the lower portion having depressions for receiving therein a section of at least one separate arrangement engaging behind the lower portion in at least one region for fixing the fastening frame to the lower portion, the depressions being concealed from the interior of a passenger compartment by the upper portion, wherein a distance from the airbag module to the component, in a direction of the airbag channel, is at least 40 mm.

18. The motor vehicle according to claim 17, wherein the component is a cross member.

* * * * *